United States Patent [19]

Sumiyoshi

[11] Patent Number: 5,766,471
[45] Date of Patent: Jun. 16, 1998

[54] MOUNTING STRUCTURE OF FILTER OF SOLENOID VALVE

[75] Inventor: Motohiro Sumiyoshi, Fujisawa, Japan

[73] Assignees: Tosok Corporation; Jatoco Corporation, both of Japan

[21] Appl. No.: 737,041

[22] PCT Filed: Mar. 29, 1996

[86] PCT No.: PCT/JP96/00847

§ 371 Date: Oct. 30, 1996

§ 102(e) Date: Oct. 30, 1996

[87] PCT Pub. No.: WO96/30685

PCT Pub. Date: Oct. 3, 1996

[30] Foreign Application Priority Data

Mar. 31, 1995 [JP] Japan ......................... 7-100223

[51] Int. Cl.⁶ ............................................. B01D 35/02
[52] U.S. Cl. .......................... 210/418; 210/495; 210/499
[58] Field of Search .......................... 210/232, 429, 210/432, 460, 471, 495, 499, 418; 137/550, 544, 549; 55/509

[56] References Cited

U.S. PATENT DOCUMENTS 3,108,610  10/1963  De See ........................... 137/550
4,187,178  2/1980  Brown ............................ 210/460

FOREIGN PATENT DOCUMENTS 69001     8/1958   France .......................... 210/495
4-30379   3/1992   Japan .
5-106756  4/1993   Japan .
5-074605  10/1993  Japan .

*Primary Examiner*—Matthew O. Savage
*Attorney, Agent, or Firm*—Lerner, David, Littenberg, Krumholz & Mentlik

[57] ABSTRACT

It is a solenoid valve used in hydraulic control. Inside a body 4, a clip plate 11 is provided at the side of an inlet 5. The clip plate 11 is formed integral by a circular support portion 12 and three retaining pawls 13 extending toward its center. On the other hand, a filter 21 of synthetic resin is formed integral by an outer frame portion 22 encircling the inlet 5, an inner frame portion 23 bisecting it and filter portions stretched therebetween. Further, a retaining convex portion 25 projecting toward the inlet 5 is provided at an intermediate portion of the inner frame portion 23. The inner frame portion 23 is elastically deformed to move the retaining convex portion 25 toward the side of the inlet 5 so that it is retained by the three retaining pawls 13 of the clip plate 11. The shape can be achieved wherein the filter 21 does not project so much from the body so that the overall size of the solenoid valve can be reduced.

14 Claims, 4 Drawing Sheets

MOUNTING STRUCTURE OF FILTER OF SOLENOID VALVE

TECHNICAL FIELD

The present invention relates to a mounting structure of a filter which is mounted to a body of a solenoid valve so as to prevent invasion of dust through an inlet opened at the body.

BACKGROUND ART

Conventionally, in a solenoid valve or the like used in hydraulic control of an automatic transmission of an automobile and attached to a block formed therein with a hydraulic circuit so as to constitute a compound valve, a filter is, in general, mounted at the inlet side of the solenoid valve fitted in the foregoing block. FIGS. 6 and 7 show such filter mounting structures, respectively.

In FIG. 6, a filter 51 is fitted, from the exterior, into a mounting portion 63 opened continuous with an inlet 62 provided at one axial end of a body 61 of a solenoid valve, and then is fixed by a C-shaped snap ring 71. The filter 51 includes a frame portion 52 made of synthetic resin and a net filter portion 53 stretched thereover and is formed integral into a bottomed cylindrical shape opening toward the inlet 62, with a flange portion 54 at the open edge fitted into the mounting portion 63. The flange portion 54 is pressed against a step portion 61a at the side of the body 61 by means of the snap ring 71 which is inserted around the filter 51 and fitted into a mounting groove 63a formed in the mounting portion 63, so that the filter 51 is ensured to be oil tight relative to the body 61 and prevented from coming off the body 61.

On the other hand, in FIG. 7, a filter 55 is fitted into a mounting portion 67 opened continuous with an inlet 66 provided at one axial end of a body 65 of a solenoid valve, and then, by caulking the peripheral edge of an opening portion 67, the filter 55 is fixed to the body 65 together with a tubular cover member 75 fitted thereover. The filter 55 is formed integral by a frame portion 56 made of synthetic resin and a net filter portion 57 stretched thereover and has a conical shape gradually opening toward an inlet 62. The filter 55 is ensured to be oil tight relative to the solenoid valve body 65 by means of an O-ring 76 fitted over the cover member 75.

However, in such conventional mounting structures, since the filter 51, 55 is fitted into the mounting portion 63, 67 provided at the body 61, 65 so as to be fixed, an area at the filter 51, 55 where the oil can flow is rendered small. Accordingly, for compensating this, it is necessary that the filter 61, 65 projects outward from the body 61, 65. Thus, there has been a problem that the overall size of the body 61, 65 is increased and a mounting counterpart of the solenoid valve, for example, the foregoing block, is subjected to the limitation in shape of a mounting portion of the solenoid valve such as a mounting hole so that the degree of freedom on designing is reduced.

The present invention has been made in view of such a conventional problem and has an object to provide a mounting structure of a filter of a solenoid valve, wherein the overall size of the solenoid valve can be reduced, and simultaneously, the degree of freedom on designing at a mounting portion of the solenoid valve can be increased.

DISCLOSURE OF THE INVENTION

For solving the foregoing problem, in the present invention, a mounting structure of a filter to be attached to a body of a solenoid valve for preventing invasion of dust through an inlet opened at the body, is such that the filter comprises an annular outer frame portion encircling the inlet and abutting the body in all circumference, an elastic inner frame portion dividing the inside of said outer frame portion into a plurality of portions and spacing apart from said body, and net filter portions closing opening portions formed by the outer frame portion and the inner frame portion, and that the inner frame portion is provided with a retaining convex portion projecting toward the inlet, while the body is provided with retaining means for retaining the retaining convex portion which is moved in a projecting direction of the inner frame portion, following elastic deformation thereof.

In such a structure, the filter is arranged to be supported to the body with the retaining convex portion provided at the inner frame portion being retained by the retaining means of the body so that the filter is not required to be fitted into the body. Thus, the situation that an area at the filter where fluid can flow is reduced, can be avoided, and hence, the shape can be achieved wherein the filter does not project so much from the body.

On the other hand, in the present invention, the retaining means is a retaining member received at the body, the retaining member comprises an annular support portion supported to the body and a plurality of retaining pawls extending toward a center portion from a plurality of portions of the support portion and engaging the retaining convex portion with their tips, and tip portions of the plurality of retaining pawls are inclined in the projecting direction of the retaining convex portion.

In such a structure, upon mounting the filter, by elastically deforming the inner frame portion to move the retaining convex portion toward the inlet side, the retaining convex portion is retained by the plurality of retaining pawls of the retaining member so that the filter is attached closely to the body and supported thereto.

BEST MODE FOR CARRYING OUT THE INVENTION

Hereinbelow, an embodiment of the present invention will be described in detail with reference to the drawings.

Figure 1:
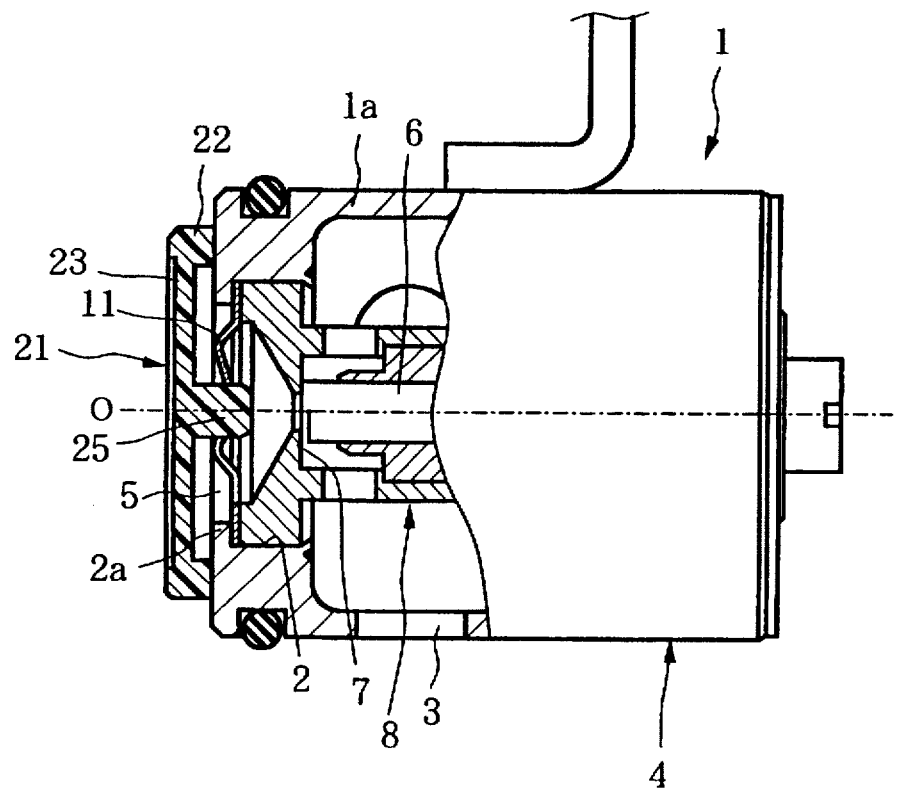
FIG. 1 is a partial sectional view showing an embodiment of the present invention, wherein an upper side with respect to a center line is a diagram at the time of a valve being closed and a lower side is a diagram at the time of the valve being opened.
Figure 2:
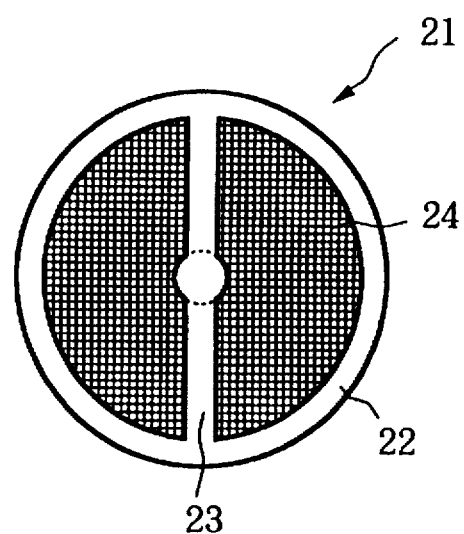
FIG. 2 is a plan view showing a filter of the embodiment.
Figure 3:
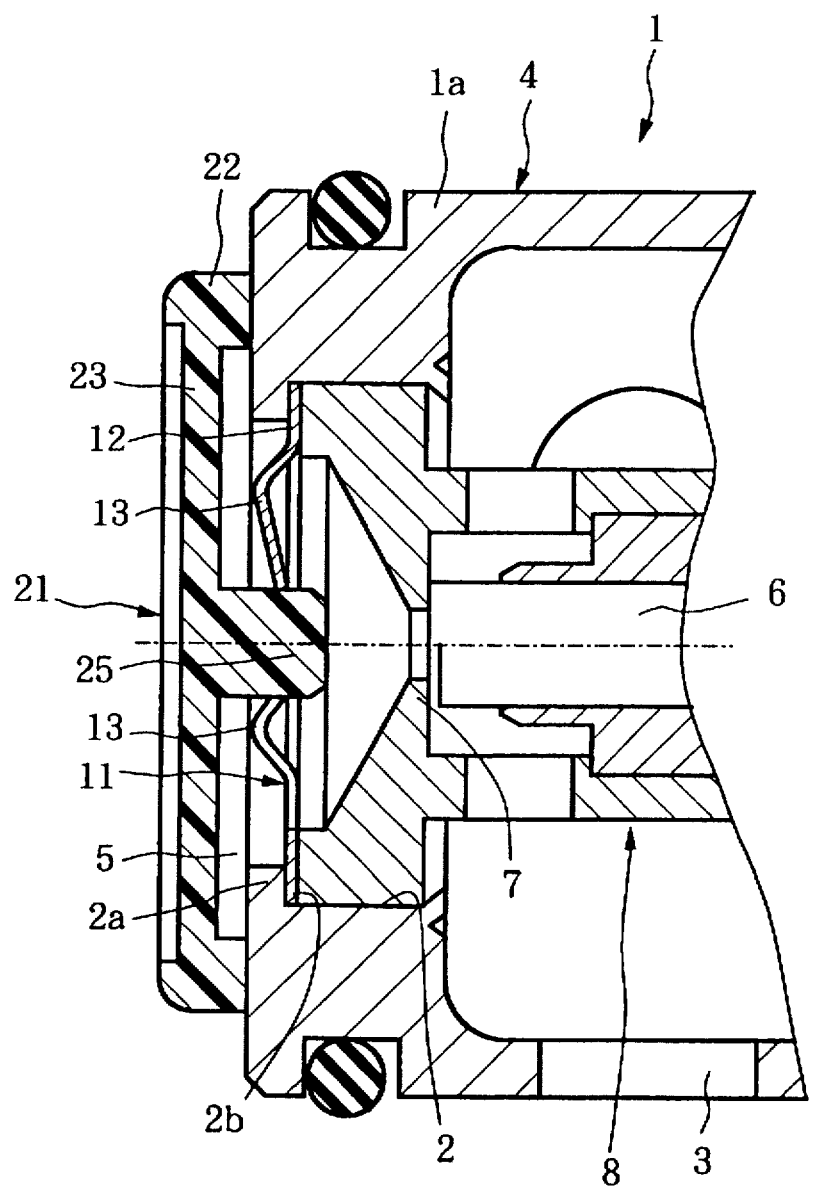
FIG. 3 is a main part enlarged view of FIG. 1.

For explaining the present invention in more detail, explanation will be made hereinbelow with reference to the accompanying drawings. FIG. 1 is a partial sectional view showing a solenoid valve 1 according to the present invention. Like the one shown in the conventional example, the solenoid valve 1 is attached to a block formed therein with a hydraulic circuit and constitutes a compound valve. In FIG. 1, an upper side with respect to a center line shows a state at the time of the valve being closed and a lower side shows a state at the time of the valve being opened.

The solenoid valve 1 is constituted by a body 4 having a mounting portion 2 opened at its axial end fitted into the foregoing block and an inlet 3 opened at its peripheral wall 1a. An outer peripheral edge 2a of the mounting portion 2 projects inward in all circumference so as to form an inlet 5 and further form a step portion 2b inside the mounting portion 2 at its one end side. Further, a seat member 8 is fitted in the mounting portion 2 for slidably supporting a valve element 6 and forming a valve seat 7. By means of this seat member 8, a clip plate 11 being retaining means of the present invention is pressed against the foregoing step portion 2b and fixed therebetween.

Figure 4:
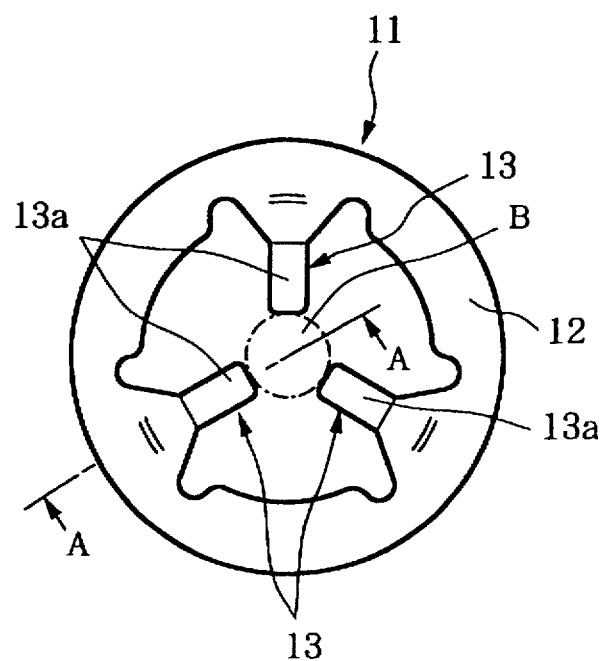
FIG. 4 is a plan view showing a clip plate of the embodiment.
Figure 5:
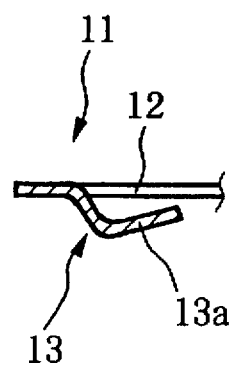
FIG. 5 is an A—A sectional view of FIG. 3.
Figure 6:
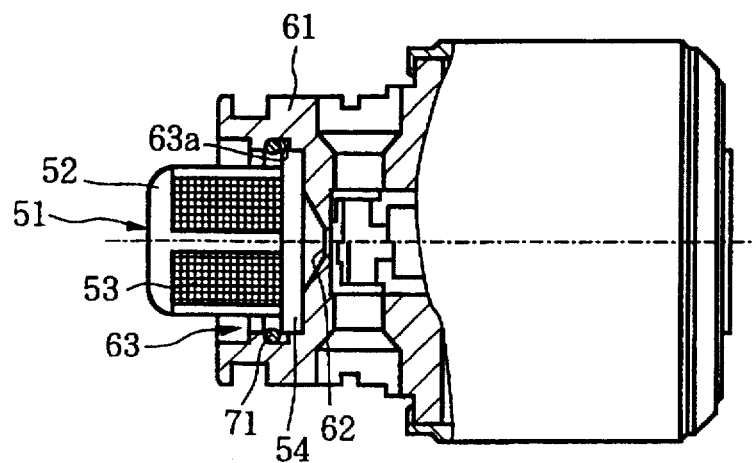
FIG. 6 is a partial sectional view showing a conventional example.
Figure 7:
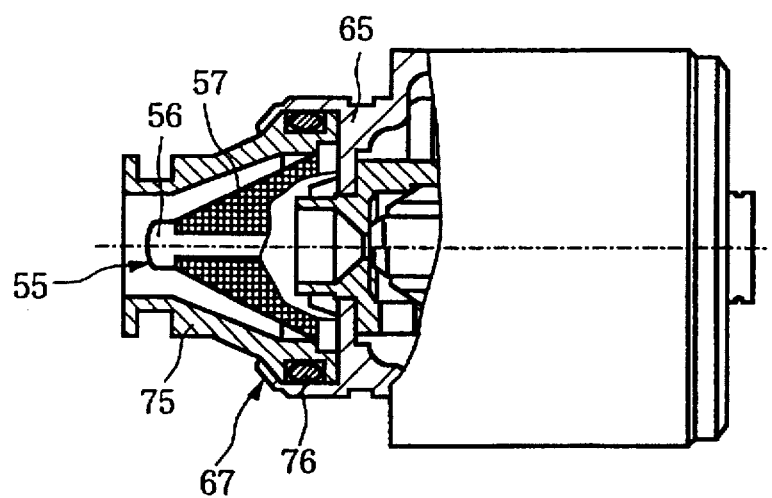
FIG. 7 is a partial sectional view showing another conventional example.

The clip plate 11 is made of a plate spring material and, as shown in FIGS. 4 and 5, includes a circular support portion 12 supported by the foregoing step portion 2b. The support portion 12 is formed integral with three retaining pawls 13, 13, 13 of the same shape which extend toward a center portion from positions trisecting the support portion 12, respectively, so as to form a receiving space B by the tips thereof. Each of the retaining pawls 13 is once bent toward the outside of the inlet 5 from the support portion 12 and then a tip portion 13a is bent again in a reverse direction toward the foregoing valve seat 7.

On the other hand, a filter 21 closing the inlet 5 is mounted to the body 4 of the solenoid valve 1. The filter 21 includes an annular outer frame portion 22 encircling the inlet 5 and abutting the body 4 in all circumference, an inner frame portion 23 bisecting the inside thereof and spacing apart from the body 4, and net filter portions 24 closing opening portions formed by the outer frame portion 22 and the inner frame portion 23. The filter 21 is formed integral of synthetic resin. The inner frame portion 23 is given proper elasticity and provided with a retaining convex portion 25 located at the center of the filter 21 and projecting toward the foregoing inlet 5. A diameter of the retaining convex portion 25 is set slightly greater than the receiving space B formed by the retaining pawls 13, 13, 13 at the center portion of the foregoing clip plate 11.

The filter 21 is mounted to the foregoing body 4 with an intermediate portion of the inner frame portion 23 being slightly curved toward the foregoing inlet 5 and with the retaining convex portion 25 being retained by the retaining pawls 13, 13, 13 of the foregoing clip plate 11. Simultaneously, by means of the elasticity of the inner frame portion 23, the tightness between the outer frame portion 22 and the body 4 is ensured.

In this embodiment having the foregoing structure, as described above, the filter 21 is supported to the body 4 with the retaining convex portion 25 provided at the inner frame portion 23 being retained by the clip plate 11 at the side of the body 4 of the solenoid valve 1. That is, it is arranged that the filter 21 is not fitted into the body 4. Thus, an area at the filter 21 where the fluid can flow, more specifically, an area of the filter portions 24, can be set greater than the conventional one, and therefore, as shown in the figure, the shape can be achieved wherein the filter 21 does not project so much from the body 4. Accordingly, the overall size of the solenoid valve 1 can be reduced, and simultaneously, the degree of freedom on designing at the mounting portion of the counterpart where the solenoid 1 is mounted, can be increased.

Further, upon mounting the filter 21, the intermediate portion of the inner frame portion 23 is pressed to elastically deform the inner frame portion 23 so that the retaining convex portion 25 is moved toward the inlet 5 to abut the tips of the retaining pawls 13, 13, 13 of the clip plate 11 with the tip thereof. At this time, the tip portion 13a of each retaining pawl 13 is bent toward the valve seat 7. That is, the tip portion 13a is inclined in the projecting direction of the retaining convex portion 25. Thus, by pressing further the intermediate portion of the inner frame portion 23, the retaining convex portion 25 deforms each retaining pawl 13 so as to enlarge the foregoing receiving space B and then passes through the receiving space B. Accordingly, the retaining convex portion 25 can be retained at the clip plate 11 only by pressing the inner frame portion 23.

Thus, the mounting operation for the filter 21 can be achieved quite easily. Therefore, in the structure of this embodiment, the assembling cost is low and further the structure is simple so that the manufacturing cost is also low. After the mounting, the retaining convex portion 25 is securely prevented from coming off by means of the respective retaining pawls 13, 13, 13. Further, no special processing is required for the inside of the body 4 so that the processing cost of the body 4 is also low.

In this embodiment, the case is shown wherein the clip plate 11 is used as the retaining means provided at the body 4 of the solenoid 1. On the other hand, it may also be arranged that a portion achieving a similar function is formed integral with the body 4.

INDUSTRIAL APPLICABILITY

As described above, in the present invention, the filter is supported to the body with the retaining convex portion provided at the inner frame portion being retained by the retaining means of the body and thus is not required to be fitted into the body so that the shape is achieved wherein the ifiter does not project so much from the body. Therefore, the overall size of the solenoid valve can be reduced, and simultaneously, the degree of freedom on designing at the mounting portion of the counterpart where the solenoid valve is mounted, can be increased.

In addition, in the present invention, it is arranged that the foregoing retaining means is in the form of the retaining member received at the body of the solenoid valve and further, upon mounting the filter, by elastically deforming the inner frame portion of the filter so as to move the retaining convex portion toward the inlet side, the retaining convex portion is retained by a plurality of the retaining pawls of the retaining member. Accordingly, the mounting operation for the filter can be achieved quite easily, the assembling cost is low and further the structure is simple so that the manufacturing cost is also low.

I claim:

1. A solenoid valve comprising a valve body having an inlet and a retaining mechanism provided at said inlet; and a filter attached to said valve body for preventing invasion of dust through said inlet, said filter comprising an annular outer frame portion encircling said inlet and abutting said valve body over the entire circumferential length thereof, an elastic inner frame portion dividing the inside of said annular outer frame portion into a plurality of open portions and spaced from said valve body, a plurality of net filter portions closing said open portions, and a retaining convex portion extending from said elastic inner frame portion toward said inlet so as to be retained by engagement with said retaining mechanism.

2. The solenoid valve according to claim 1, wherein said elastic inner frame portion is slightly curved toward said inlet, and said annular outer frame portion abuts tightly upon said valve body due to the elasticity of said elastic inner frame portion.

3. The solenoid valve according to claim 1, wherein said retaining mechanism comprises a retaining member, said retaining member including an annular support portion supported by said valve body at said inlet and a plurality of retaining pawls having tips, said retaining pawls extending from said annular support portion toward a center thereof and engaging said retaining convex portion with said tips so that said retaining convex portion is retained thereby.

4. The solenoid valve according to claim 3, wherein each of said retaining pawls comprises a tip portion including said tip, said tip portion inclined in an extending direction of said retaining convex portion.

5. The solenoid valve according to claim 3, wherein each of said retaining pawls comprises a first portion extending from said annular support portion so as to be inclined in a direction opposite to an extending direction of said retaining convex portion and a second portion including said tip and extending from said first portion so as to be inclined in said extending direction of the retaining convex portion.

6. The solenoid valve according to claim 3, wherein solid retaining pawls are arranged at regular intervals along said annular support portion.

7. The solenoid valve according to claim 1, wherein said filter is formed integral of synthetic resin.

8. A solenoid valve comprising a valve body having an inlet and a retaining mechanism secured at said inlet; and a filter attached to said valve body overlying said inlet, said filter comprising an annular outer frame portion encircling said inlet and abutting a portion of said valve body over the entire circumferential length thereof, an elastic inner frame portion dividing the inside of said annular outer frame portion into a plurality of open portions, a net filter portion closing said open portions, and a retaining convex portion extending from said elastic inner frame portion toward said inlet, said retaining convex portion engaging said retaining mechanism for retaining said filter overlying said inlet whereby said annular outer frame portion remains abutting said valve body.

9. The solenoid valve according to claim 8, wherein said elastic inner frame portion is curved toward said inlet, and said annular outer frame portion abuts tightly upon said valve body due to the elasticity of said elastic inner frame portion.

10. The solenoid valve according to claim 8, wherein said retraining mechanism comprises a retaining member, said retaining member including an annular support portion supported by said valve body at said inlet and a plurality of retaining pawls having tips, said retaining pawls extending from said annular support portion toward a center thereof and engaging said retaining convex portion with said tips so that said retaining convex portion is retained thereby.

11. The solenoid valve according to claim 10, wherein each of said retaining pawls comprises a tip portion including said tip, said tip portion inclined in an extending direction of said retaining convex portion.

12. The solenoid valve according to claim 10, wherein each of said retaining pawls comprises a first portion extending from said annular support portion so as to be inclined in a direction opposite to an extending direction of said retaining convex portion and a second portion including said tip and extending from said first portion so as to be inclined in said extending direction of the retaining convex portion.

13. The solenoid valve according to claim 10, wherein said retaining pawls are arranged at regular intervals along said annular support portion.

14. The solenoid valve according to claim 8, wherein said filter is formed integral of synthetic resin.

* * * * *

UNITED STATES PATENT AND TRADEMARK OFFICE
CERTIFICATE OF CORRECTION

PATENT NO. : 5,766,471
DATED : June 16, 1998
INVENTOR(S) : Sumiyoshi

It is certified that error appears in the above-identified patent and that said Letters Patent is hereby corrected as shown below:

Inventor:
On the Title Page, line 3, "Fujisawa" should read --Kanagawa-ken--.

Column 5, line 18, "solid" should read --said--.

Column 6, line 9, "retraining" should read --retaining--.

Signed and Sealed this

Twentieth Day of October, 1998

Attest:

BRUCE LEHMAN

Attesting Officer

Commissioner of Patents and Trademarks